(No Model.) 2 Sheets—Sheet 1.

J. M. DODGE.
ELEVATING MECHANISM.

No. 575,636. Patented Jan. 19, 1897.

Witnesses:
R. Schleicher.
Alex. Barkoff

Inventor:
James M. Dodge
by his Attorneys
Howson & Howson (No Model.) 2 Sheets—Sheet 2.

J. M. DODGE.
ELEVATING MECHANISM.

No. 575,636. Patented Jan. 19, 1897.

Witnesses:
R. Schleicher
Alex. Barkoff

Inventor:
James M. Dodge
by his Attorneys
Howson & Howson

United States Patent Office.

JAMES M. DODGE, OF PHILADELPHIA, PENNSYLVANIA, ASSIGNOR TO THE LINK-BELT ENGINEERING COMPANY, OF SAME PLACE.

ELEVATING MECHANISM.

SPECIFICATION forming part of Letters Patent No. 575,636, dated January 19, 1897.

Application filed May 12, 1892. Serial No. 432,765. (No model.)

*To all whom it may concern:*

Be it known that I, JAMES M. DODGE, a citizen of the United States, and a resident of Philadelphia, Pennsylvania, have invented certain Improvements in Elevating Mechanism, of which the following is a specification.

The object of my invention is to construct mechanism whereby the buckets of an elevator can be charged with a given amount of material, such as broken stone, without creating unnecessary friction and without causing the buckets to rapidly wear away, as fully described hereinafter.

My invention is especially applicable to elevators used for lifting broken rock and like substances, but can, however, be used for other purposes.

Figure 3:
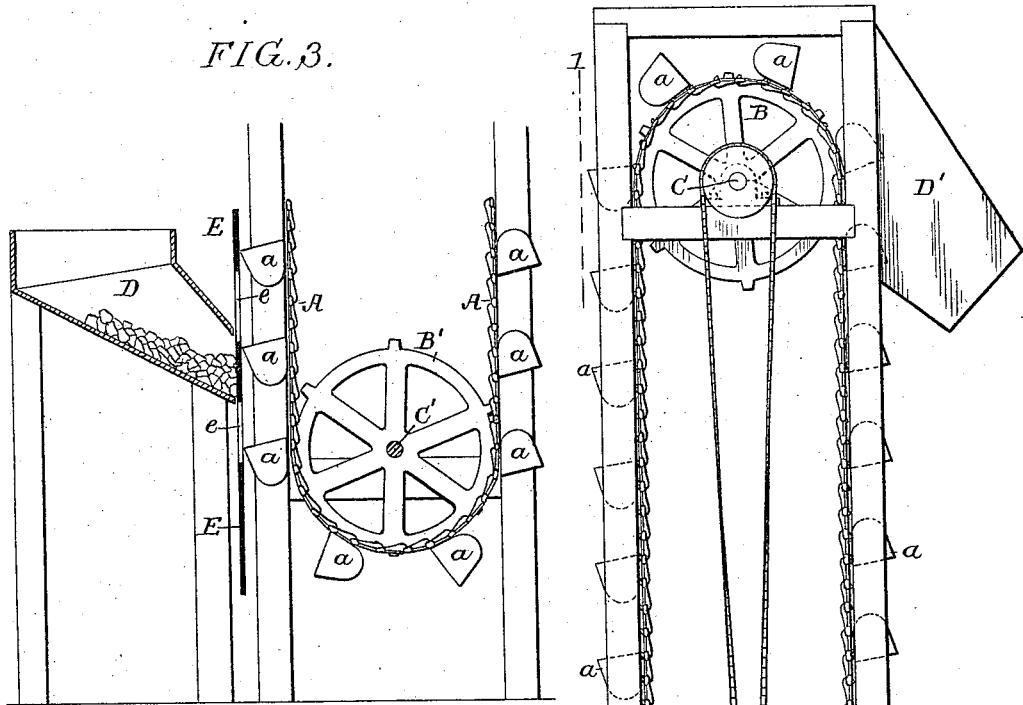
Figure 1:
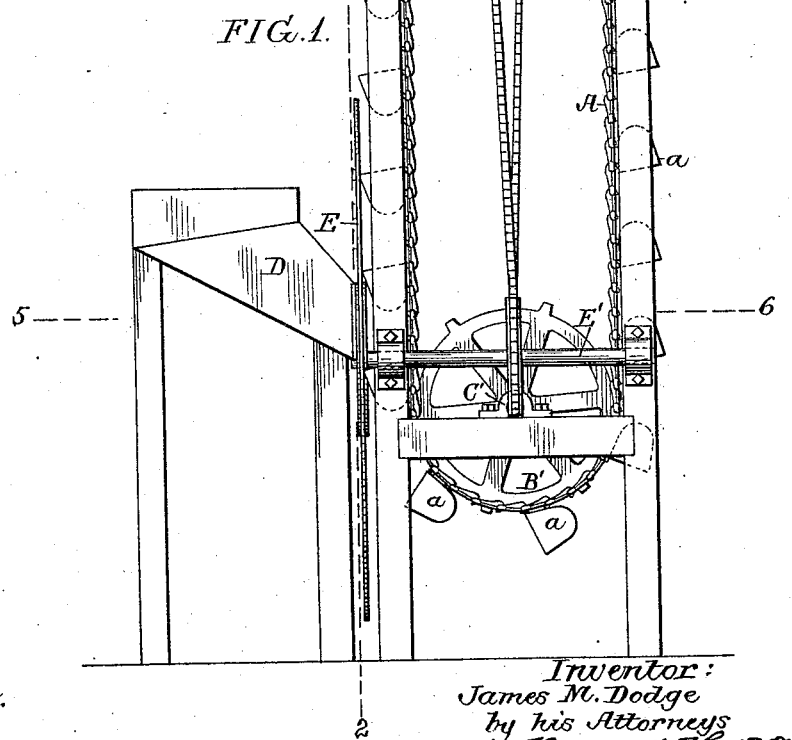
Figure 4:
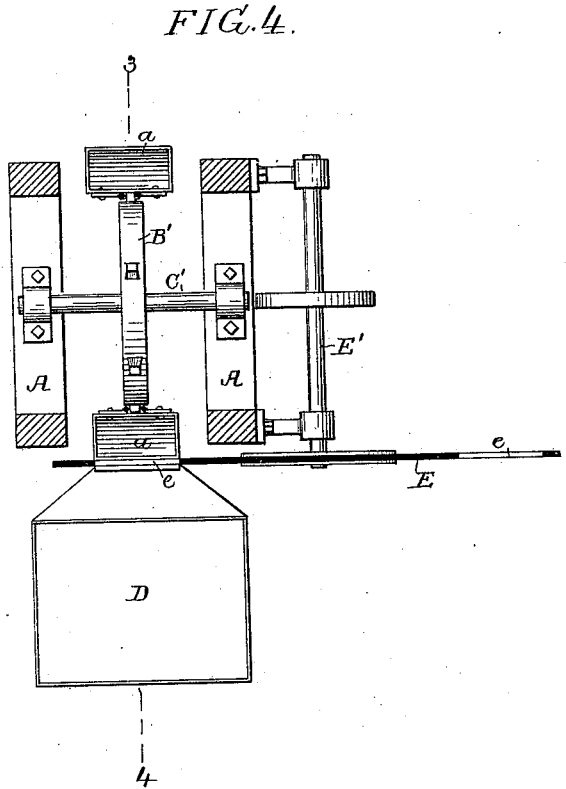
Figure 2:
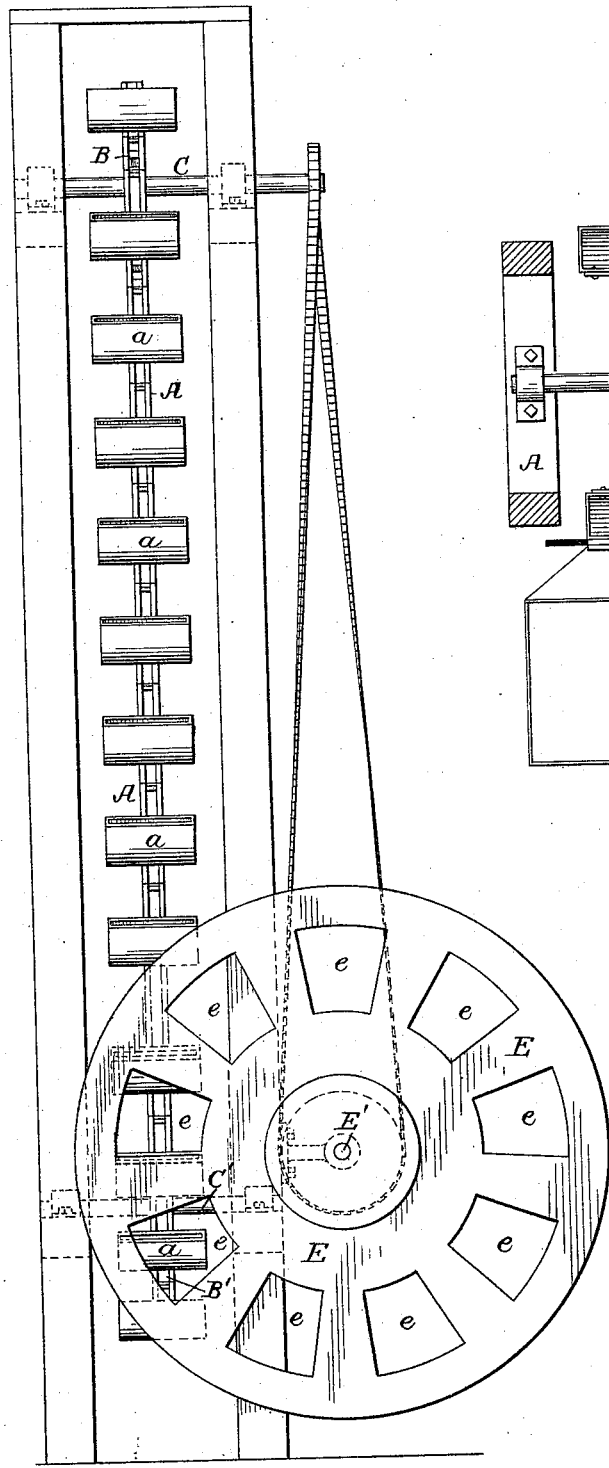

In the accompanying drawings, Figure 1 is a side view of my improved elevator. Fig. 2 is a section on the line 1 2, Fig. 1. Fig. 3 is a section on the line 3 4, Fig. 4; and Fig. 4 is a section on the line 5 6, Fig. 2.

A is the conveyer-chain, having buckets $a$ thereon. This chain is adapted to wheels B B' on shafts C C', situated in the elevator-well. Power is applied to one of these shafts, in the present instance the upper shaft, and the carrying run of buckets is the run at the side next the inlet-chute D, the discharge-chute D' being at the opposite side, as clearly shown in the drawings.

The material, such as broken rock, for instance, is fed into the chute from a hopper or bin and flows into the buckets. A valve may be employed to regulate the flow of rock through the chute.

The ordinary method of elevating such material as broken stone is to discharge it into an elevator-boot through which the buckets pass, taking their load in their passage. Consequently the friction is excessive, consuming a great amount of power and causing the buckets to wear out rapidly. I overcome this objection and provide an even feed, so that the amount delivered to each bucket will be about the same proportion, and is so regulated as not to exceed its carrying capacity by mounting between the side feed-chute and the buckets a valve E, which cuts off the supply of material until the buckets reach a certain point, allowing the buckets to fill and again cutting off the supply, so that the action of the valve is intermittent. This valve E in the present instance is what may be termed a "disk valve," being mounted upon a shaft E', driven from the driving-shaft of the machine by suitable belting. This disk valve has a series of openings $e$ therein, preferably of the shape shown in Fig. 2, and the valve is driven in the same direction as the bucket-carrying chain, so that it will close from below. The speed of the valve is preferably the same as the speed of the chain, so that the upper edge of the buckets will coincide with the lower edge of the openings, but as soon as the bucket passes the opening the valve closes the exit from the chute until a certain time when the next bucket reaches a certain point. Then the next opening in the disk allows the material to pass into this bucket, filling it to the proper proportion, and so on. Thus the valve regulates the feed of material into the buckets and prevents the overflowing and jamming of the material, and consequently avoids the wear and breakage of the machinery and the waste of power.

I claim as my invention—

1. The combination in an elevator, of a side feed-chute, a bucket elevator receiving material from said chute, a driven slide-valve at the mouth of the chute and means for driving said slide-valve up through the material, said valve allowing the material to be fed to the elevator intermittently so that each bucket will be properly charged, thus preventing the overflowing of the buckets and jamming of the material, substantially as described.

2. The combination in an elevator, of the side feed-chute, the bucket elevator receiving material from said chute, with a disk having a series of openings, said disk being driven at the same speed as the buckets and in the same direction allowing the intermittent discharge of the material from the chute into the buckets, substantially as set forth.

In testimony whereof I have signed my name to this specification in the presence of two subscribing witnesses.

JAMES M. DODGE.

Witnesses:
HENRY HOWSON,
HARRY SMITH.